G. E. DOYLE & G. BARDEN.
WHEEL FOR COMMON ROAD VEHICLES.
APPLICATION FILED MAR. 5, 1914.

1,141,384.

Patented June 1, 1915.

UNITED STATES PATENT OFFICE.

GEORGE EDWARD DOYLE, OF SYDNEY, AND GEORGE BARDEN, OF NEWTOWN, NEAR SYDNEY, NEW SOUTH WALES, AUSTRALIA.

WHEEL FOR COMMON ROAD-VEHICLES.

1,141,384.  Specification of Letters Patent.  Patented June 1, 1915.

Application filed March 5, 1914. Serial No. 822,561.

*To all whom it may concern:*

Be it known that we, GEORGE EDWARD DOYLE and GEORGE BARDEN, subjects of the King of Great Britain and Ireland, residing, respectively, at 19 Shepherd street, Sydney, in the State of New South Wales, Australia, and 28 Richard street, Newtown, near Sydney aforesaid, have invented certain new and useful Improvements in Wheels for Common Road-Vehicles, of which the following is a specification.

Our invention relates to wheels for common road vehicles, and in particular to "spring wheels" of the type in which the outer part of the wheel (comprising the rim, felly and spokes) has limited freedom of motion radially and rotationally in relation to the hub.

According to this invention the spokes or equivalent parts of the wheel are set in a collar which is contained within cheeks or flanges on the hub, so as to be freely movable therein rotationally and radially, but not laterally. This collar contains a group of cylindrical pockets axially parallel with the hub, each of which pockets accommodates a plurality of spiral springs. Through the eye of each spring a thimble is threaded; a bolt is passed through each thimble and the ends of these bolts are mounted in the hub flanges. The concentricity of the felly and rim with the hub and axle is maintained resiliently by the group of spiral springs, and these springs also operate to permit limited rotational movement of the spokes and felly relatively to the hub, and to buffer the drive and brake stresses. A free but limited floating motion of the outer relatively to the central part of the wheel is thus permitted, but the wheel is laterally supported in the close sliding fit of the spoke collar and the hub flanges. In practice, from eight to ten pockets are provided, symmetrically disposed about the wheel center to carry the spiral springs, and in each of these pockets a plurality of similar spiral springs (preferably three springs) are set side by side in the manner beforementioned.

Figure 1:
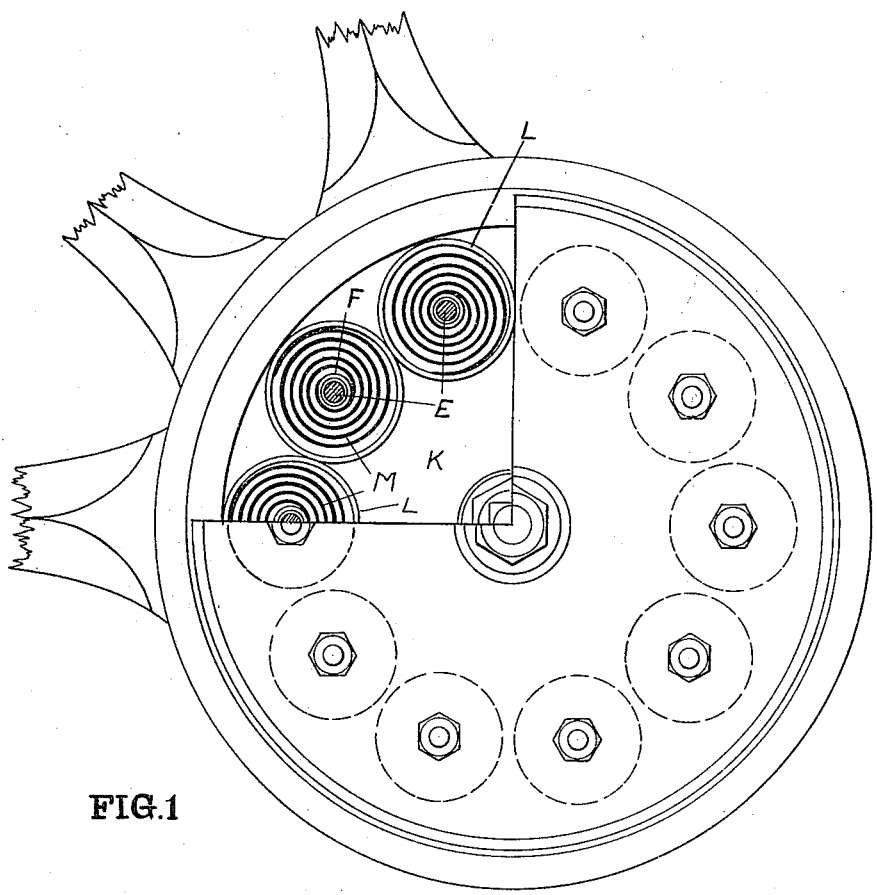
Figure 2:
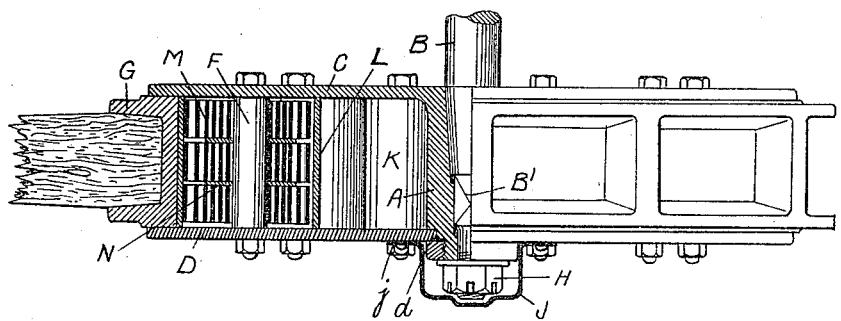

In the accompanying explanatory drawings, Figure 1 is an elevational end view of the hub and its flanges showing a sector of one of the hub flanges cut away; Fig. 2 is a half horizontal section and plan corresponding with Fig. 1.

The method of tenoning or otherwise securing the spoke roots in the collar is immaterial to the invention. Wire, wooden, or metal spokes may be used suitably mounted in or attached to the collar, following existing practice in connection with other types of wheel already in use.

The hub A which is mounted on the axle B is formed with an integral flange C. The cover cheek plate or flange D is spigoted at *d* on the outer part of the hub A and is through bolted to the flange C by bolts E passed through spacing thimbles F which maintain the flanges C and D apart with proper clearance between them for the spoke collar G. When drive is to be applied to the wheel through the axle, the end of the axle may be squared or castellated as shown at B', or the axle may be fixed to the hub A by a key.

H is a castellated back nut by means of which the wheel is secured upon the axle.

J is an axle cap, the flange of which may be conveniently pinned at *j* to the face of the flange D.

When the wheel is to be a free running wheel, the squared end B, or the key or other attachment for securing the axle to the hub A, is omitted and the hub permitted to run directly on the axle or on ball bearings carried on the axle, not shown in the drawings.

The flanges D and C inclose a clear annular space K which accommodates the spoke collar G. This collar contains a group of cylindrical pockets L arranged symmetrically in relation to the hub A and axially parallel thereto. In practice eight to twelve such pockets are ordinarily used, but a greater or less number may be used without departing from the invention. Each of the pockets L accommodates a plurality of spiral wound springs M; in practice it is preferred to fit three such springs in parallel arrangement in each pocket as shown clearly in Fig. 2, and to set a spacing washer N between said springs so as to allow working clearance for the movement of the spoke collar G in relation to the through bolts E. The eyes of the springs M being carried on the spacing thimbles F and their outer parts taking in the pockets L, operate to maintain radial and rotational positioning of the spoke collar G in relation to the hub A, but the flexure of the springs within the limit of movement allowed by the size of the pockets L permits a certain radial and rotational freedom of the spoke collar G in relation to the hub A. Consequently road shocks are not transmitted directly from the spokes to the axle. These shocks are cushioned by the springs M, while similarly driving and braking stresses are also cushioned, with the result that driving and braking effects are softened. The pockets L as shown are tubes tightly fitted in the spoke collar G and each fixed to it by rivets or by autogenous welding; these tubes may also be welded together where they touch thereby to make the system of pocket tubes rigid with the collar G.

The brake drum or a chain driving sprocket may be mounted on the outer face of the flange C for the purpose of applying braking and driving force, as the case may be, to the wheel. The construction described provides an effective means whereby the outer part of the wheel is free to float radially and rotationally within the limit of motion permitted by the springs in relation to the wheel hub and the axle, a cushion drive and cushion brake effect being obtained while the wheel acts also to cushion road shocks. Furthermore the construction is such that the resilient motion of the relatively moving parts is not affected materially by intrusion of water and road grit.

The pockets L may be cored in the collar G, or they may be constituted of tubular attachments mounted in said collar as above described or they may be pockets in the collar G bushed with metal. The stiffness of the springs M is proportionate to the load carried by the axle and to the power required to be transmitted through the hub in the case of a driven wheel. All the springs act in concert to support the axle and absorb vibration and to take up torsional stresses due to application of driving and braking forces.

What we claim as our invention and desire to secure by Letters Patent is:—

In a wheel for vehicles the combination of a hub having an integral wide flange, a removable flange adapted to form with said integral flange an annular space, a spoke-collar arranged in said space and free to move relatively to said hub both radially and circumferentially, cylindrical casings circularly arranged in said spoke collar at an equal distance from said hub and substantially of the same width as the said spoke collar, a plurality of flat spiral springs disposed side by side within each of said casings, spacing washers between adjacent springs in each casing, bolts connecting said flanges and supporting the inner ends of said springs, thimbles surrounding said bolts for spacing said flanges, and a wheel rim supported by said spoke collar.

In testimony whereof we have affixed our signatures in presence of two witnesses.

GEORGE EDWARD DOYLE.
GEORGE BARDEN.

Witnesses:
W. J. DAVIS,
S. BECK.